United States Patent [19]
Thual et al.

[11] Patent Number: 6,014,483
[45] Date of Patent: Jan. 11, 2000

[54] METHOD OF FABRICATING A COLLECTIVE OPTICAL COUPLING DEVICE AND DEVICE OBTAINED BY SUCH A METHOD

[75] Inventors: Monique Thual, Trebeurden; Jean Lostec, Prat; Patrick Auvray, Ploumilliau; Bénédicte Clavel, Toulouse, all of France

[73] Assignee: France Telecom, Paris, France

[21] Appl. No.: 08/910,848

[22] Filed: Aug. 13, 1997

[30] Foreign Application Priority Data

Aug. 21, 1996 [FR] France ................................ 96 10327

[51] Int. Cl.<sup>7</sup> .................................................. G02B 6/255
[52] U.S. Cl. ................................ 385/33; 385/34; 385/95
[58] Field of Search ............................ 385/33, 34, 95–98

[56] References Cited

U.S. PATENT DOCUMENTS

| | | | |
|---|---|---|---|
| 4,701,011 | 10/1987 | Emkey et al. | 385/34 |
| 5,095,519 | 3/1992 | Dorsey | 385/140 |
| 5,457,759 | 10/1995 | Kalonji et al. | 385/31 |
| 5,488,506 | 1/1996 | Krisvoshlykov et al. | 359/341 |
| 5,757,993 | 5/1998 | Abe | 385/34 |

FOREIGN PATENT DOCUMENTS

| | | |
|---|---|---|
| 175486 | 3/1986 | European Pat. Off. . |
| 233639 | 4/1987 | European Pat. Off. . |
| 575993 | 12/1993 | European Pat. Off. . |
| 603042 | 6/1994 | European Pat. Off. . |
| 2225124 | 5/1990 | United Kingdom ..... 385/33 |
| WO 95 18395 | 7/1995 | United Kingdom . |
| WO 86 04156 | 7/1986 | WIPO . |

OTHER PUBLICATIONS

*Journal of Lightwave Technology*, vol. 13, No. 8, Aug. 1995, Shiraishi et al. "A Fiber Lense With a Long Working Distance for Integrated Coupling Between Laser Diodes and Single–Mode Fibers".

*Patent Abstracts of Japan*, vol. 8, No. 51, Nov. 1984, & JP 58 202413, Nov. 1983.

*Primary Examiner*—Rodney Bovernick
*Assistant Examiner*—Ellen E. Kang
*Attorney, Agent, or Firm*—Nilles & Nilles SC

[57] ABSTRACT

A device for collective optical coupling between a single-mode fiber bundle and an electronic module in the optical telecommunications field which includes joining the single-mode fiber bundle to a graded-index fiber bundle and fracturing the fibers of the graded-index fiber bundle so as to produce graded-index fiber sections in order to form a lens at each end of the single-mode fibers.

6 Claims, 5 Drawing Sheets

SINGLE-MODE   GRADED-INDEX

SINGLE-MODE   GRADED-INDEX

POSITION OF THE KNIFE $L \mu m$

GRADED-INDEX SECTION OF LENGTH L

SINGLE-MODE    SILICA + GRADED-INDEX
(OBTAINED AFTER STEP 5)

SINGLE-MODE    SILICA + GRADED-INDEX

POSITION OF THE KNIFE

← L μm

GRADED-INDEX SECTION OF LENGTH L

METHOD OF FABRICATING A COLLECTIVE OPTICAL COUPLING DEVICE AND DEVICE OBTAINED BY SUCH A METHOD

BACKGROUND OF THE INVENTION

1. Field of the Invention

The present invention relates to a collective optical coupling method and device, which consists in transferring an electromagnetic wave from an active component such as a laser to a guiding medium such as an optical fiber, or from one guiding medium to another guiding medium.

The field of the invention is that of optical telecommunications and more particularly that of distribution networks which concern short-distance connections and require considerable effort in terms of cost as regards both infrastructures and terminal components. In the field of telecommunications, the wave-length is usually 1.3 or 1.55 $\mu$.

The joining of optoelectronic modules, called optical coupling, constitutes an operation whose cost needs to be reduced. One solution consists in treating this operation collectively. There are two difficulties: on the one hand, there is the difficulty associated with the mismatch of the shape and size of the optical modes of the elements to be coupled and, on the other hand, the difficulty of positioning them with submicron precision.

This is because the coupled power drops by 1 dB when positioning departs from the optimum position, in the plane perpendicular to the optical axis, by a distance less than 1 micron and along the optical axis by a few microns ($\mu$). Dynamic positioning of the elements to be coupled is known, i.e. adjusting the positioning in real time depending on the degree of coupling. However, passive assembly between linear arrays of components and combs of fibers, which consists in positioning the various elements without supplying the components, is difficult to carry out.

2. Description of the Related Art

To solve the problem of laser-fiber coupling, the use of a microlens has been proposed. K. Shiraishi et al. have proposed, in particular, a lens consisting of a section of coreless fiber having a hemispherical end, obtained by micromachining, this section being fusion spliced to a single-mode fiber whose core has been locally widened by heating. The degrees of coupling obtained have severe positioning tolerances. These solutions are complex to implement and difficult to make compatible with a collective treatment on fiber ribbons, for example.

OBJECTS AND SUMMARY OF THE INVENTION

The first object of the present invention is to propose a method of fabricating a coupling device which makes it possible to relax the tolerances on positioning the fibers along the optical axis and in the plane perpendicular to this axis.

All the steps in carrying out the method according to the invention are entirely collective. This is because, according to the invention, throughout the method only fiber ribbons are manipulated, and all the fibers in a given ribbon undergo the same operations at the same moment. There are many advantages, not only in economical terms, in particular due to the time saved in the fabrication and assembly which stems from a collective treatment compared to an individual treatment, but also in terms of uniformity of the microoptics obtained at the end of the ribbon.

The economical and reproducible character of our optics stems from the simplicity of the method proposed, since it comprises only simple operations such as stripping and cleavage, and fusion splicing, this making the method reproducible.

The solution to the problem posed consists in carrying out a method of fabricating a device for optical coupling between a single-mode fiber bundle and an optoelectronic module, mainly consisting in that it includes at least the following steps:

collective joining of the fibers of the single-mode fiber bundle to the fibers of a graded-index fiber bundle;

collective fracture of the fibers of the graded-index fiber bundle so as to produce graded-index fiber sections in order to collectively form a lens at each end of the single-mode fibers of the bundle.

Another solution to this problem consists in carrying out a method of fabricating a device for optical coupling between a single-mode fiber bundle and an optoelectronic module mainly characterized in that it includes the following steps:

collective joining of the single-mode fiber bundle to a silica fiber bundle;

collective fracture of the fibers of the silica fiber bundle so as to produce silica fiber sections in order to place the single-mode fibers at the correct distance from lenses located at each end of the silica fibers and/or to match the index of the propagation medium of the single-mode fibers to the lenses;

joining of the fibers of the silica fiber section bundle to the fibers of a graded-index fiber bundle;

fracture of the fibers of the graded-index fiber bundle so as to produce graded-index fiber sections in order to collectively form a lens at each end of the silica fiber sections.

According to another embodiment, the silica sections are replaced by any type of matched index fiber, for example a stepped-index fiber.

According to a preferred mode of implementation of the method forming the subject of the invention, the fiber bundles have a structure in the form of at least one ribbon.

Of course, the method also applies to the case where the fiber bundles would be reduced to a single fiber.

In an application of implementation of the method, the optoelectronic module consists of active components, the number of which corresponds to the number of fibers to be coupled.

These active components are either lasers or photodiodes.

In an application of implementation of the method, the optoelectronic module consists of a single-mode fiber bundle.

A second subject of the invention also consists of a device for optical coupling between at least one single-mode fiber and an optoelectronic module, which includes at least one lens, characterized in that each lens is formed by a cylindrical section of graded-index fiber having an external diameter of 125 $\mu$m.

According to other preferred modes, the device according to the invention:

furthermore includes, between the single-mode fiber and the lens, a silica fiber section intended to place the single-mode fiber at the correct distance from the lens and/or to match the index of the propagation medium of the single-mode fiber to that of the lens.

In the case where the device achieves coupling between several single-mode fibers and an optoelectronic module, the single-mode fibers have a structure in the form of a ribbon.

According to certain applications, the electronic module is composed of an assembly of active components:

the active components are lasers;

the active components are photodiodes.

For other applications, the electronic module is composed either of a single-mode fiber or of a fiber bundle, the device then serving to couple the optical fibers together.

According to a preferred embodiment, the fibers are structured in the form of at least one ribbon.

BRIEF DESCRIPTION OF THE DRAWINGS

The advantages provided by the invention will be more clearly understood through the following description which refers to the appended drawings which illustrate the invention without any limiting character and in which.

DESCRIPTION OF THE PREFERRED EMBODIMENTS

The description hereinbelow is based on fiber bundles in the form of ribbons within which the fibers are aligned and uniformly spaced apart. The technology for fabricating such ribbons is well known today and will not be explained in further detail. Hereafter, we shall refer to fiber ribbons rather than fiber bundles.

The first embodiment of the method includes the steps of joining a single-mode fiber ribbon to a graded-index multimode fiber ribbon and of fracturing the graded-index fibers.

The details in the execution of these steps are illustrated respectively by FIGS. 1A to 1C and 1D, 1E:

insertion and alignment of the two fiber ribbons 10 and 20 in the fusion splicer, (1A);

fusion splicing of the fibers of the two ribbons 10, 20, (1B);

alignment of the plane of fusion splicing with the trace of the plane of fracture, (1C);

displacement of the assembly by a distance L and fracture initiation, (1D); and fracture of the graded-index multimode fiber ribbon, (1E).

The second embodiment of the method includes the steps of joining a graded-index multimode fiber ribbon to a silica fiber ribbon, fracture of the silica fibers, joining of this assembly to a single-mode fiber ribbon and, finally, fracture of the fibers of the graded-index multimode fiber ribbon.

Figure 1A:
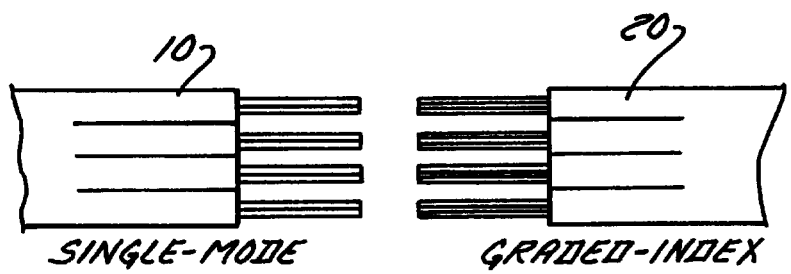
FIGS. 1A to 1E diagrammatically illustrate the steps in the method of fabricating a coupling device according to a first embodiment.
Figure 1B:
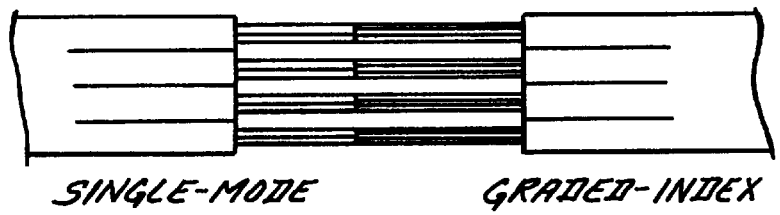
Figure 1C:
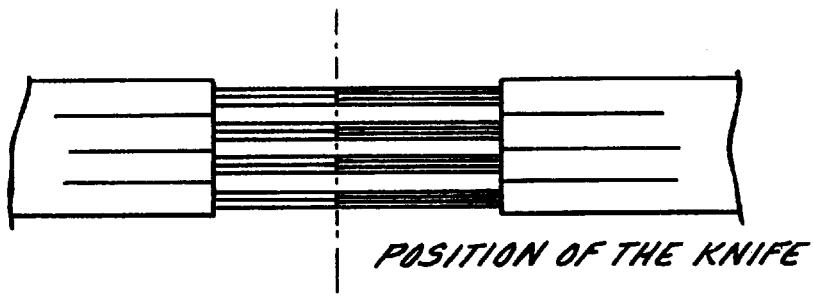
Figure 1D:
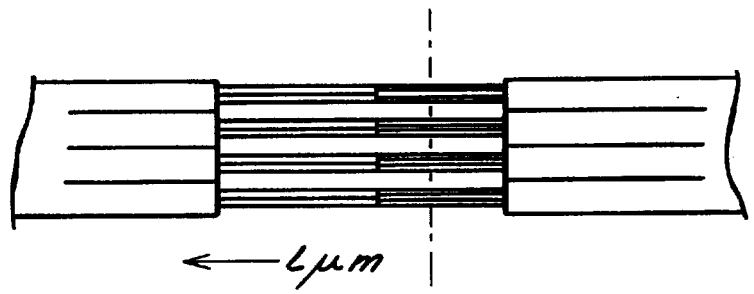
Figure 1E:
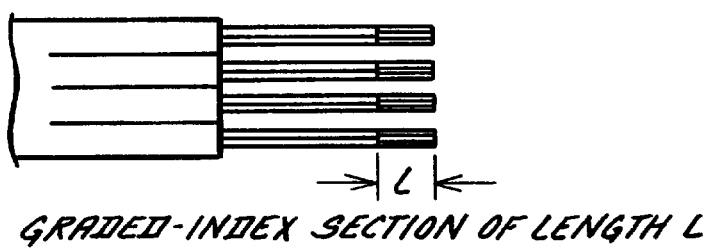
Figure 2A:
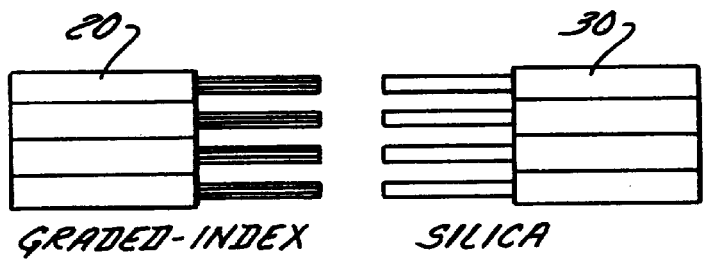
FIGS. 2A to 2J diagrammatically illustrate the various steps in the method according to the invention.
Figure 2B:
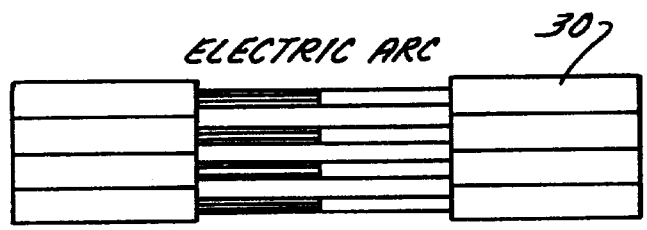
Figure 2C:
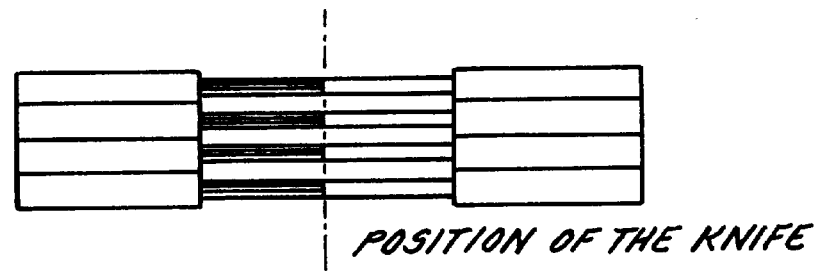
Figure 2D:
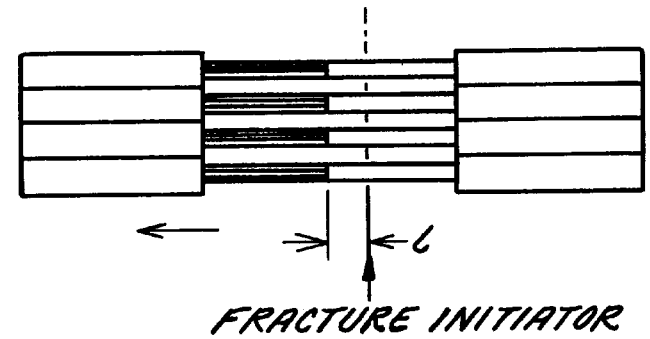
Figure 2E:
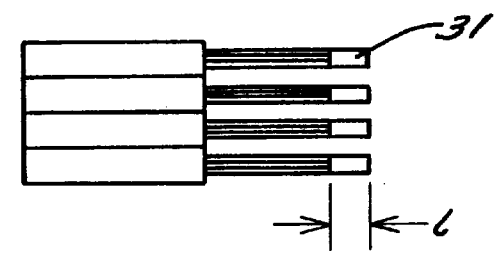
Figure 2F:
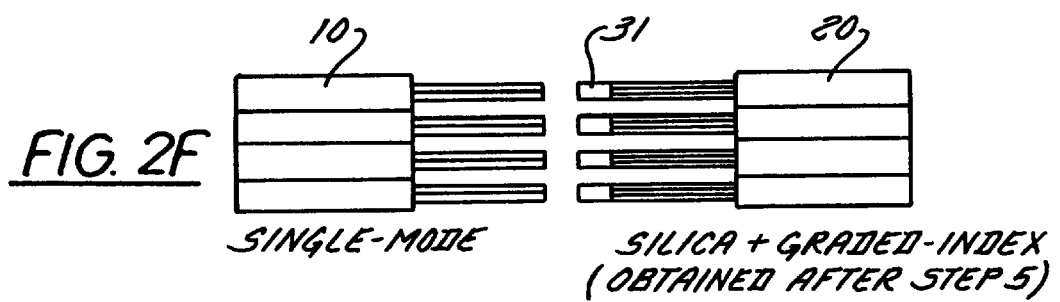
Figure 2G:
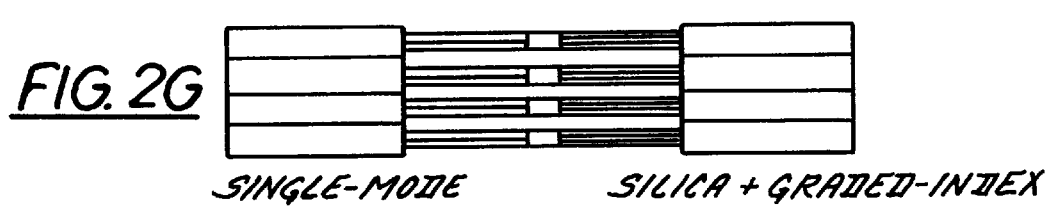
Figure 2H:
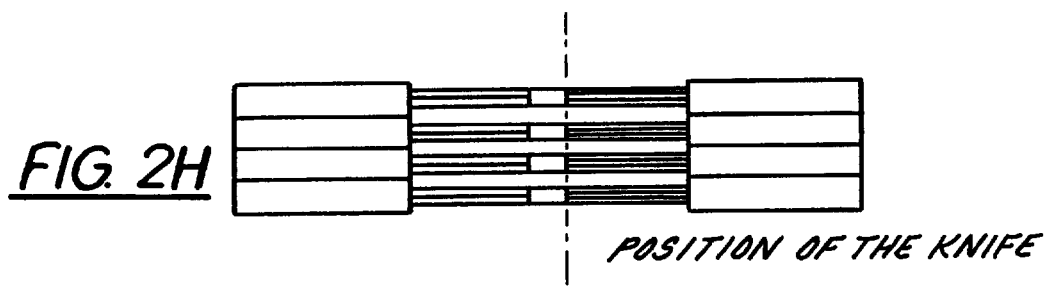
Figure 2I:
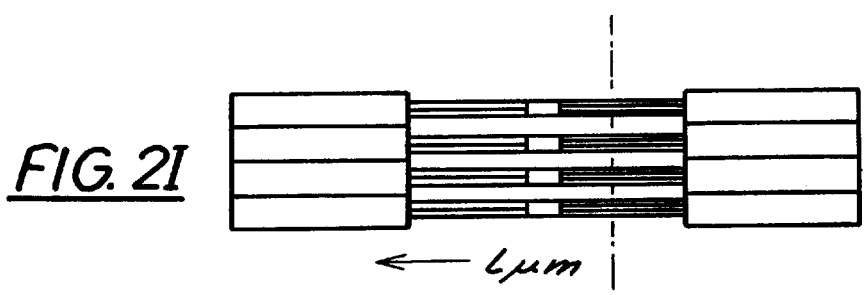
Figure 2J:
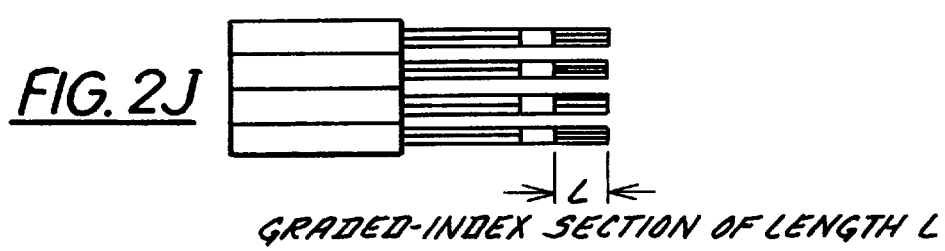

The details of execution of these steps are illustrated respectively by FIGS. 2A to 2C; 2D, 2E; 2F to 2I and 2J;

stripping and cleavage of the silica ribbons 30 and of the graded-index multimode fibers 20 and insertion into a fusion splicer having a V-shaped periodic structure with a pitch corresponding to the pitch of the ribbon used, for example 250 $\mu$, each V corresponding to the external diameter of a fiber, for example 125 $\mu$, (FIG. 2A);

fusion splicing of the silica fiber ribbons 30 to the graded-index fiber ribbons 20, (2B);

alignment of the plane of fusion splicing with the trace of the plane of fracture, (2C);

translation of the assembly through a distance 1, and then initiation of the fracture, (2D);

fracture of the fibers of the ribbon using a fracture rig so as to produce n silica sections of length 1, n being the number of fibers contained in the ribbon. At this stage n silica fiber sections of length 1 fusion spliced to n graded-index multimode fibers are obtained, (2E);

repetition of the steps on the assembly thus produced and a single-mode fiber ribbon 10. Thus a collective optical coupling device is obtained which consists of cylindrical sections of fibers having end-to-end shape continuity;

insertion and alignment of the ribbons 10 and 20 in the fusion splicer, (2G);

fusion splicing of the single-mode fibers to the silica sections 31, (2G);

alignment of the plane of fusion splicing with the plane of fracture, (2H);

displacement of the assembly by a distance L and fracture initiation, (2I); and fracture of the graded-index multimode fiber ribbon, (2J).

Principle of operation of the coupling devices, obtained by this method:

In a graded-index multimode fiber, the beams propagate along the optical axis in a periodic manner. This is due to the successive lateral refractions undergone by the electromagnetic wave when it propagates in a medium whose index decreases from the center of the fiber to the periphery. The period P (often called the pitch) depends on the index profile of the fiber, which follows a parabolic law, and on the wavelength of the light propagating therein.

When a section of graded-index multimode fiber is cut, a lens is obtained whose properties depend on its length L, which is defined as a fraction of P (i.e. L=P/4, P/2, 3P/2, or more generally xP, x being any real number), on the graded-index profile of the fiber and on the operating wavelength.

Mode matching between the object and the image takes place by virtue of the graded-index fiber section in the same way as with a conventional plane-plane graded-index lens (10).

The role of the silica is to spatially extend the output light beam from the single-mode fiber. This extension makes it possible to use the entire graded-index volume. The graded-index section is then exploited to the maximum extent as a lens since the volume occupied by the light beam is equal to the graded-index volume.

The silica sections could be replaced by sections of matched-index fibers, for example stepped-index fibers.

Figure 3:
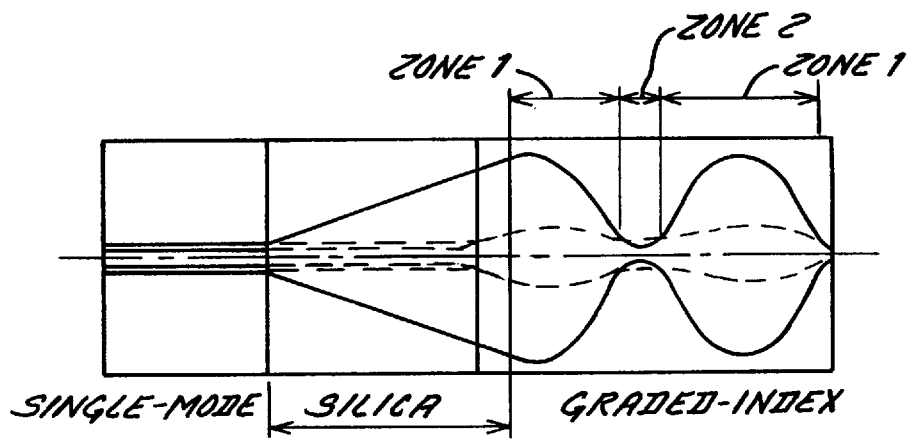
FIG. 3 illustrates the propagation of the beam with (in the solid lines) and without (in the dotted lines) the silica section interposed between the single-mode fiber and the graded-index fiber section.

FIG. 3 illustrates in a qualitative manner the difference in propagation of the beam with and without a silica section between the single-mode fiber and the graded-index lens. (NB: the actual dimensions are not respected).

Two different zones in the graded-index fiber after propagation of the beam in the silica section may be distinguished:

zone 1, in which the spatial extension of the light beam is greater than that obtained without the silica section;

zone 2, in which the spatial extension of the light beam is less than that obtained without a silica section.

By choosing the silica and graded-index length at the start of zone 1 correctly, it is possible to obtain a greater spatial extension of the output light beam from the optics than optics without silica. This configuration relates, for example, to fiber-to-fiber connection applications with a path in free space or to photodiode space illumination applications.

By choosing the silica and graded-index length at the end of zone 1 or in zone 2 correctly, it is possible to obtain a greater spatial extension of the output light beam from the optics than optics without silica. This configuration makes it possible to obtain focal spots smaller than 10 µm, so as to match this optic to a laser, for example.

For some applications, when the extension of the graded-index lens is equal to 0, the silica sections may have a zero length, in which case the graded-index fiber ribbon is directly fusion bonded to the single-mode fiber ribbon.

Considering an 85/125 (core diameter/external diameter) graded-index multimode fiber operating at 1.3 µm, a 62.5/125 fiber or any other fiber having a suitable graded index:

In fiber-to-fiber connection applications, it is desired to increase the size of the fiber output mode in order to relax the positioning tolerances, while increasing the working distance. To be sure, the graded-index fiber section alone, fusion bonded to a single-mode fiber, makes it possible to increase the size of the output fiber mode from the optic, but in a limited manner compared to the configuration which comprises a silica section between the graded-index fiber and the single-mode fiber.

For a graded-index section alone, the maximum mode diameter is about 28 µm for a graded-index length of P/4 (i.e. 365 µm), and the working distance is then zero. The maximum distance between fibers is 460 µm, for an associated mode diameter of 20 µm.

With a silica section interposed between the graded-index lens and the single-mode fiber, the maximum mode diameter is 80 µm instead of 28 µm and the maximum distance between fibers is 1.8 mm instead of 460 µm, the coupling loss being equivalent in both cases (0.5 dB).

The optical coupling devices produced according to the method of the invention have several applications in multichannel emitter or receiver modules in the fiber-optic telecommunications field. In particular, this optical system is compatible with passive collective joining, on a silicon substrate, of linear arrays of PIN photodiodes or of semiconductor lasers placed in front of the single-mode fiber ribbons.

They are also used in connection applications: high-performance alignment and highly tolerant multichannel connectors.

For a semiconductor laser/single-mode fiber application, the graded-index multimode fiber section alone, fusion bonded onto the end of the single-mode fiber does not make it possible to match the output mode diameter from the optic to that from the laser (approximately 2 µm) since this diameter cannot go below 10 µm for a graded-index length of P/2, i.e. 730 µm.

On the other hand, by interposing a silica section, typically 500 µm, between the graded-index lens (typically 400 µm in length) and the single-mode fiber, an output mode diameter from the optic which is matched to that from the laser is obtained. Thus, the coupling performance is improved, the losses typically going from 10 to 4.5 dB for lasers with a mode diameter of 1.6 µm. This is a very good performance for optics produced using a simple, entirely collective method.

In addition, because of the presence of the silica section, the laser-fiber working distance is about 50 µm, instead of contact as in the case of the cleaved fiber or the pure graded-index section.

Figure 4:
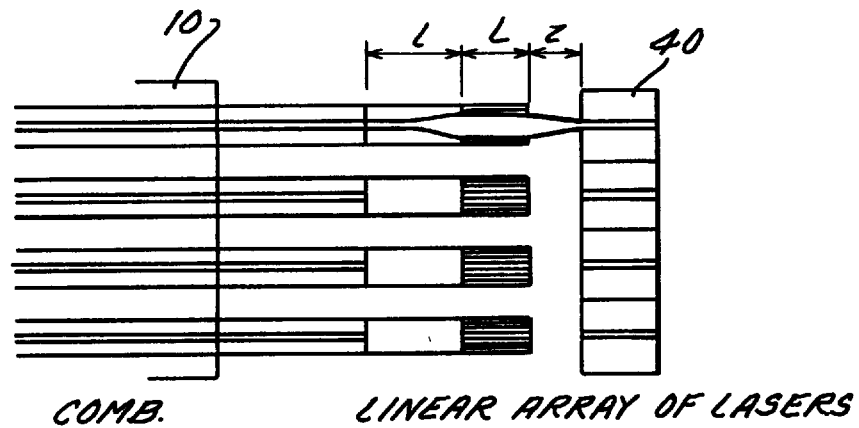
FIG. 4 diagrammatically illustrates a device for collective optical coupling between a fiber ribbon and a micromodule consisting of a linear array of lasers.

FIG. 4 represents a diagram showing the principle of the coupling between a linear array of lasers and a single-mode fiber ribbon provided with a device according to the invention.

The characteristics of the lasers used in linear arrays are as follows:

type: BRS wavelength: 1.3 µm.

The angles of divergence and the mode radii of the Gaussian beam of the laser, measured at $1/e^2$ of the maximum intensity in the planes parallel and perpendicular to the plane of the junction of the laser, are as follows:

T1

| ½ angle of divergence | Mode radius |
|---|---|
| $\theta_{para} = 25°$ | $\omega_{para} = 0.89$ µm |
| $\theta_{perp} = 30°$ | $\omega_{perp} = 0.71$ µm |

Measured power, using an integrating sphere, for a 20C 30 mA polarization current: P=4000µW.

The coupling losses, between the laser described above and the optical device given in Table T2, are 3.9 dB for a working distance of 63 µ.

T2

| 1 (µm) | L (µm) | working distance (µm) | coupling losses (dB) | tolerances in x and y at −1 dB (µm) | tolerance in z at −1 dB (µm) |
|---|---|---|---|---|---|
| 1063 | 330 | 63 | 3.9 | ±1.1 | ±6 |

By way of comparison, the coupling efficiency between the same laser and a cleaved single-mode fiber is 9.1 dB for a working distance of 20 µm, and is 12 dB for a working distance of 63 µm. The Gaussian beam of the cleaved single-mode fiber used has a symmetry of revolution and a mode radius of 4.5 µm, i.e. a half angle of divergence of 5.2°. The cleaved fiber should be in contact with the laser in order to obtain the least losses, i.e. 8.6 dB, however it cannot be placed there without damaging the laser.

The device according to the invention therefore makes it possible to decrease the coupling losses compared with an optimally placed cleaved fiber and to increase the 63 µm working distance.

The optical coupling device according to the invention makes it possible to obtain illumination of PIN photodiodes.

The optical device described in Table T3 makes it possible to shift the focal point back from 0 to 200 µm and to increase the mode diameter from 9 to 12 µm, compared to a cleaved fiber.

For the illumination of a 70 µm PIN photodiode, so as to illuminate the entire surface of the photodiode:

T3

| 1 (μm) | L (μm) | Focal distance z (μm) | Mode diameter D in z (μm) |
|---|---|---|---|
| 169 | 350 | 200 | 12 |

Figure 5:
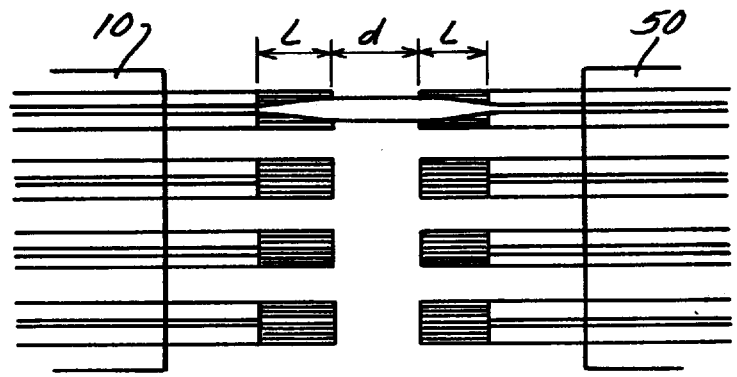
FIG. 5 diagrammatically illustrates a device for collective optical coupling between a fiber ribbon and a micromodule consisting of another single-mode fiber ribbon equipped with the same coupling device.

The optical coupling device according to the invention has been shown diagrammatically in FIG. 5 in a fiber-to-fiber connection application.

For fiber-to-fiber connection applications, the positioning tolerances at −1 dB in the plane perpendicular to the optical axis between two fibers of the device are ±5 μm as opposed to 1.5 μm between two cleaved fibers.

The example shown in FIG. 5 involves only graded-index multimode fiber sections; the addition of silica sections makes it possible to increase the distance between the ribbons, from about a hundred microns to several millimetres.

Figure 6:
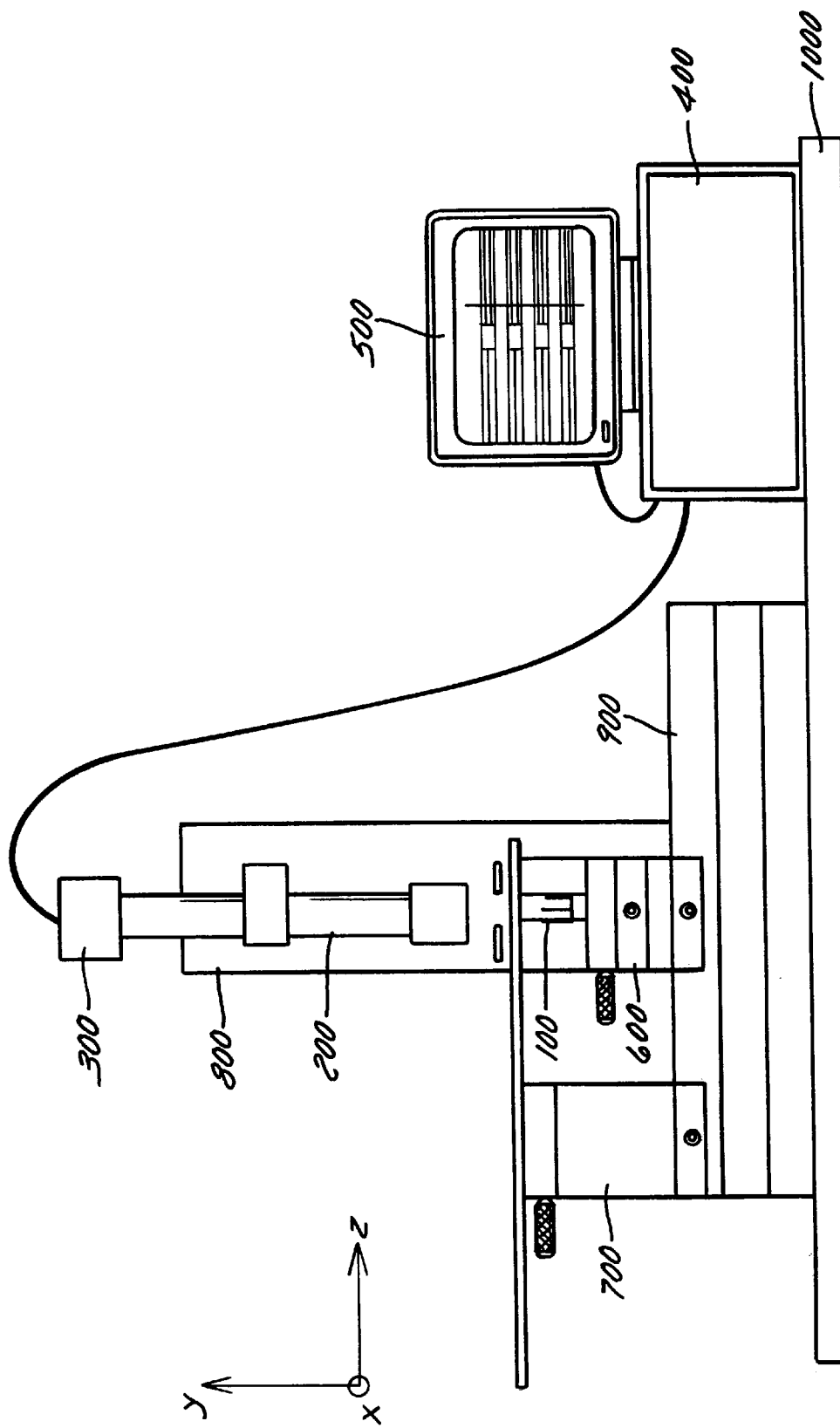
FIG. 6 illustrates a fracture rig.

The optical devices are produced according to the method using a standard ribbon fusion splicer and the fractures of the sections of precise length are well carried out on the rig shown diagrammatically in FIG. 6.

The various steps described above are observed with the aid of video microscope 200 with annular illumination, placed above the rail 900 which supports the fracturing tool 100. This is a Fujikura ribbon-fracturing tool, but any collective fracturing tool may be suitable, provided that it enables the fracture zone to be observed from above.

The video microscope 200 is linked to a camera 300, the image from which is displayed on a video monitor 500 after processing by a distance-measurement system 400. This system projects straight lines which can be shifted on the screen and, by means of a prior calibration, enables the distances to be measured.

The fracturing tool 100 can be moved in three directions x, y and z by means of the unit 600 which comprises 3 manual micrometer displacement stages, this unit itself being fixed to the rail 900 by means of a clip. The fiber ribbon is moved along the optical axis using the unit 700, which comprises a manual micrometer displacement stage, itself connected to the rail 900 by means of a clip. This degree of freedom along the optical axis z makes it possible to bring the splicing plane to the desired point with respect to the knife of the fracturing tool.

Alignment between the splicing plane and the trace of the knife is performed visually using the video microscope. The displacement of the ribbon is adjusted to the desired dimension by means of the measurement system 400. The video microscope is supported by a support column 800, the whole assembly being supported by a stable base 1000.

We claim:

1. A method of fabricating a device for optically coupling a single-mode fiber bundle and an optoelectronic module, comprising the steps of:

collectively joining the fibers of the single-mode fiber bundle to fibers of a silica fiber bundle; then collectively fracturing the fibers of the silica fiber bundle so as to produce silica fiber sections that place the single-mode fibers at the correct distance from lenses located at each end of the silica fibers and/or that match the index of the propagation medium of the single-mode fibers to the lenses; then collectively joining the fibers of the silica fiber section bundle to fibers of a graded-index fiber bundle; then collectively fracturing the fibers of the graded-index fiber bundle so as to produce graded-index fiber sections that collectively form lenses at the ends of the silica fiber sections.

2. A method of fabricating a coupling device according to claim 1, wherein a stepped-index fiber is used instead of the silica fiber bundle.

3. A method of fabricating a device for optically coupling a single-mode fiber bundle to an optoelectronic module, comprising:

simultaneously splicing all of the fibers of said single-mode fiber bundle to corresponding fibers of a first fiber bundle formed from one of a silica fiber bundle and a stepped-index fiber bundle; then simultaneously cutting all of said fibers of said first fiber bundle so as to produce fiber sections that 1) place said single-mode fibers at a desired distance from lenses located at each end of said fibers of said first bundle, and/or 2) match the index of a propagation medium of said fibers of said single-mode fiber bundle to the index of said lenses; then simultaneously splicing all of said fibers of said first fiber bundle to corresponding fibers of a graded-index fiber bundle; and then simultaneously cutting all of said fibers of said graded-index fiber bundle so as to produce graded-index fiber sections that collectively form lenses at ends of said fibers of said first fiber bundle.

4. A method as defined in claim 3, further comprising optically coupling said single-mode fiber bundle to said optoelectronic module.

5. A method as defined in claim 4, wherein said optoelectronic module is one of a laser and a photodiode.

6. A method of fabricating a device for optically coupling a single-mode fiber to an optoelectronic module, comprising:

splicing the single-mode fiber to a first fiber formed from one of a silica fiber and a stepped-index fiber; then cutting said first fiber so as to produce a fiber section that 1) places said single-mode fiber at a desired distance from lenses located at each end of said first fiber, and/or 2) matches the index of a propagation medium of said single-mode fiber to the index of said lenses;

splicing said first fiber to a graded-index fiber; and then cutting said graded-index fiber so as to produce a graded-index fiber section that forms a lens at the end of said first fiber.

* * * * *